United States Patent [19]

Honda et al.

[11] Patent Number: 4,705,211

[45] Date of Patent: Nov. 10, 1987

[54] CARD-TYPE DATA TERMINAL OPERATIVELY CONNECTABLE TO ELECTRONIC APPARATUS

[75] Inventors: Toshio Honda, Yao; Kosuke Nishimura, Yamatokoriyama, both of Japan

[73] Assignee: Sharp Kabushiki Kaisha, Osaka, Japan

[21] Appl. No.: 708,543

[22] Filed: Mar. 5, 1985

[30] Foreign Application Priority Data

Mar. 7, 1984 [JP] Japan ............................. 59-33274[U]

[51] Int. Cl.⁴ .............................................. G06K 5/00
[52] U.S. Cl. ...................................... 235/380; 235/379
[58] Field of Search ............................. 235/379, 380

[56] References Cited

U.S. PATENT DOCUMENTS

| | | | |
|---|---|---|---|
| 4,277,837 | 7/1981 | Stuckert | 235/379 |
| 4,454,414 | 6/1984 | Benton | 235/379 |
| 4,523,087 | 6/1985 | Benton | 235/379 |
| 4,614,861 | 9/1986 | Pavlov et al. | 235/380 |

*Primary Examiner*—Harold I. Pitts
*Attorney, Agent, or Firm*—Birch, Stewart, Kolasch & Birch

[57] ABSTRACT

A card-type compact data terminal is provided being operatively connectable to a portable electronic apparatus. The data terminal can be removed from the apparatus. The data terminal serves to input and store data for the apparatus while separated from the apparatus. When it is operatively combined with the apparatus, the stored data within the data terminal are processed by the apparatus, even complicated processes, at high speed.

13 Claims, 2 Drawing Figures

CARD-TYPE DATA TERMINAL OPERATIVELY CONNECTABLE TO ELECTRONIC APPARATUS

BACKGROUND OF THE INVENTION

The present invention relates to a terminal connectable to an electronic apparatus and, more particularly, to a card-type compact data terminal operatively connectable to a portable electronic apparatus.

A portable electronic apparatus that is as compact as possible is desirable. The problem is that as the body of the apparatus becomes compact, its keyboard, memory capacity, and display are also compact, and their operability may become inferior. High-speed operation of such a compact electronic apparatus cannot be expected. Therefore, conventionally, optimum combinations of compactness and operability should be balanced.

SUMMARY OF THE INVENTION

Accordingly, it is an object of the present invention to provide an improved terminal for an electronic apparatus.

It is another object of the present invention to provide an improved card-type terminal operatively connectable to an electronic apparatus.

It is a further object of the present invention to provide an improved card-type compact data terminal operatively connectable to a portable electronic apparatus, the terminal functioning to input and store data for the apparatus when separated from the apparatus, so as to be operatively connected to the apparatus to process the stored data.

Briefly described, in accordance with the present invention, a card-type compact data terminal is provided, being operatively connectable to an electronic apparatus. The data terminal can be removed from the apparatus. The data terminal serves to input and store data for the apparatus while separated from the apparatus. When it is operatively coupled to the apparatus, the stored data within the data terminal are processed by the apparatus, even complicated processes, at high speed.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
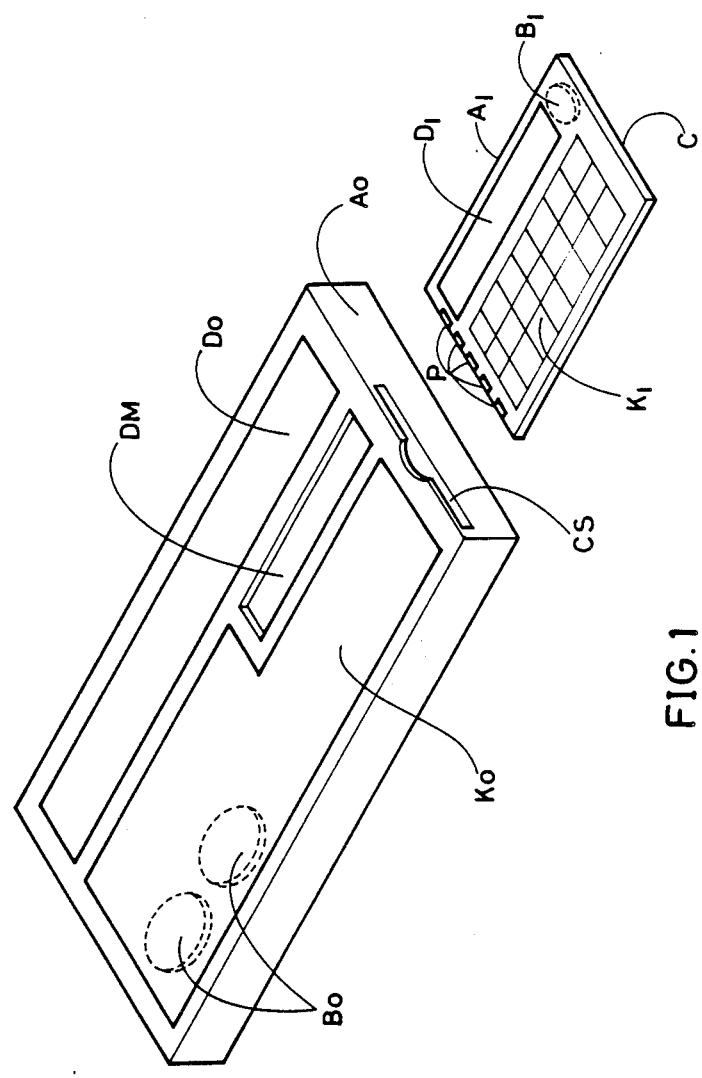
FIG. 1 is a perspective view of a portable electronic apparatus and a card-type data terminal operatively connectable to the apparatus according to the present invention.
Figure 2:
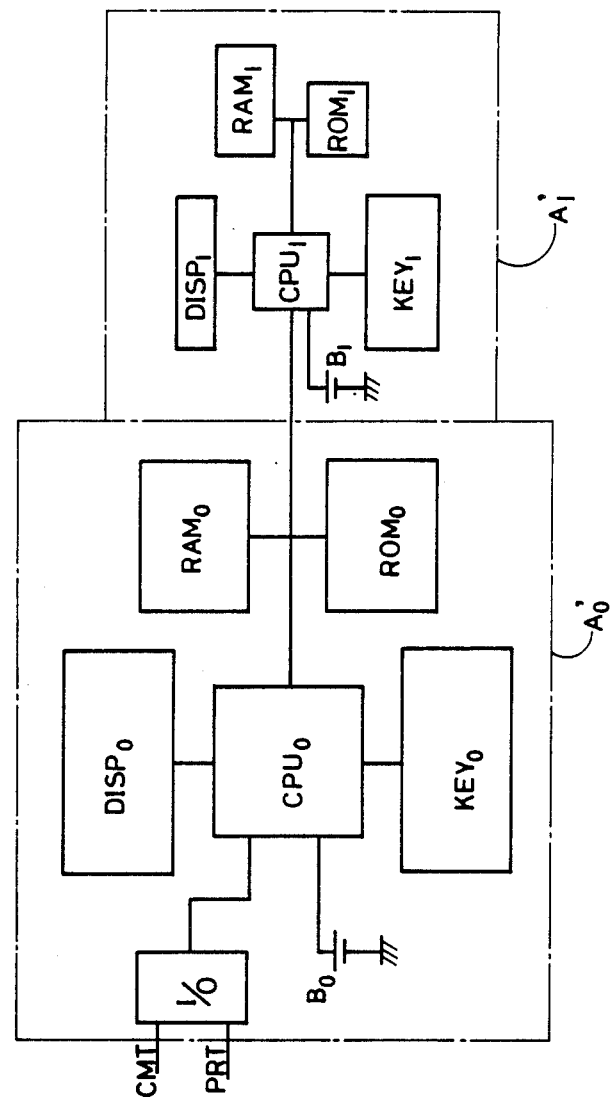
FIG. 2 is a block diagram of an operatively combined circuit of first and second circuits, respectively, implemented within the apparatus and the data terminal of FIG. 1.

FIG. 1 is a perspective view of a portable electronic apparatus and a card-type data terminal operatively connectable to the apparatus according to the present invention. FIG. 2 is a block diagram of an operatively combined circuit of first and second circuits, respectively, implemented within the apparatus and the card-type data terminal of FIG. 1.

With reference to FIG. 1, a portable electronic apparatus $A_0$ comprises a display $D_0$ such as a liquid crystal display, a keyboard $K_0$, and a power battery $B_0$. According to an embodiment of the present invention, the body of the apparatus $A_0$ is provided with an external terminal storing portion CS and a display window DM. Within the external terminal storing portion CS, a card-type terminal $A_1$ is inserted. An electrical and mechanical connector is provided at the innermost of the external terminal storing portion CS to electrically and mechanically connect the data terminal $A_1$ with the apparatus $A_0$. The display window DM is provided so as to confront with a display of the external data terminal $A_1$ when inserted, so that the display of the external terminal $A_1$ is visible from the outside of the apparatus $A_0$.

The card-type external terminal $A_1$ is provided so that a card-type base C supports a keyboard $K_1$, a display $D_1$ such as a liquid crystal display, a memory, a central processing unit (CPU), a power battery $B_1$, and a connector P. When the terminal $A_1$ is inserted into the terminal storing portion CS of the apparatus $A_0$, the connector P is electrically and mechanically combined with the connector positioned at the innermost of the storing portion CS.

With reference to FIG. 2, a first circuit of the portable electronic apparatus $A_0$ is designated by $A_0'$. The circuit $A_0'$ comprises a central processing unit $CPU_0$, a keyboard circuit $KEY_0$, a display circuit $DISP_0$, a read/write memory or random access memory $RAM_0$, a read only memory $ROM_0$, an input/output interface I/O, and a battery $B_0$. The input/output interface I/O is provided for electrically connecting the central processing unit $CPU_0$ with an additional external memory such as a compact magnetic tape (CMT), and a printer PRT of the apparatus $A_0$.

A second circuit, a circuit of the card-type terminal $A_1'$ is designated by $A_1'$. The circuit $A_1'$ comprises a central processing unit $CPU_1$, a keyboard circuit $KEY_1$, a display circuit $DISP_1$, a read/write memory or random access memory $RAM_1$, a read only memory $ROM_1$, and a battery $B_1$. The capacity of these circuit elements is selected to be as small as possible as long so they can meet the requirements of the external terminal $A_1$, so that the terminal $A_1$ can become compact like a card. Data can be inputted into the external terminal $A_1$ by operating the keyboard $K_1$ and stored within the read/write memory $RAM_1$. Relatively simple calculation can be conducted in the terminal $A_1$ by operating the $CPU_1$, the $ROM_1$, and the $RAM_1$. The results can be displayed in the display $D_1$.

When the terminal $A_1$ is electrically and mechanically combined with the apparatus $A_0$ on condition that the connector P of the terminal $A_1$ is connected with the connector of the apparatus $A_0$, relatively complicated and high-speed calculations can be conducted by the apparatus $A_0$ accommodating the terminal $A_1$. The data transference from the terminal $A_1$ to the apparatus $A_0$ can be confirmed with the main display $D_0$ and the secondary display $D_1$ through the display window DM.

Because the card-type terminal $A_1$ can be removed from the apparatus $A_0$ and is very handy, it is carried by the operator to collect the data for the apparatus $A_0$. Relatively simple calculations can be conducted by the terminal $A_1$.

The application of the present invention should not be limited to the portable electronic apparatus like the apparatus $A_0$. Any type of electronic apparatus can accommodate the card-type terminal $A_1$ of the present invention.

While only certain embodiments of the present invention have been described, it will be apparent to those skilled in the art that various changes and modifications may be made therein without departing from the spirit and scope of the present invention as claimed.

What is claimed is:

1. A compact data terminal system comprising:
   a portable electronic apparatus, comprising,
     a housing,
     first means, disposed in said housing, for displaying data,
     keyboard means, disposed in said housing, for operating said portable electronic apparatus,
     processing means for carrying out operations entered by said keyboard means, and
     external terminal storing portion disposed in said housing; and
   a card-type external terminal, comprising,
     memory means for storing data,
     second keyboard means for entering data into said memory means,
     second processing means for manipulating data entered by said second keyboard means, and
     connector means for electrically and mechanically connecting said card type external terminal to said portable electronic apparatus at said external terminal storing portion.

2. The system of claim 1 wherein said card-type external terminal further comprises a second means for displaying data stored in said memory means, produced by said second processing means or entered by said second keyboard means.

3. The system of claim 2 wherein said portable electronic apparatus further comprises a display window means for making said second means for displaying data visible when said card-type external terminal is connected to said portable electronic apparatus.

4. The system of claim 2 wherein said first means for displaying data comprises a first liquid crystal display and said second means for displaying data comprises a second liquid crystal display.

5. The system of claim 2 wherein said portable electronic apparatus further comprises:
   display driving means, connected to said processing means, for driving said first means for displaying data;
   second memory means, connected to said processing means for storing data entered into said portable electronic apparatus; and
   interfacing means for electrically connecting said processing means to a peripheral device.

6. The system of claim 5 wherein said portable electronic apparatus further comprises a first battery means for supplying power to the elements of said portable electronic apparatus.

7. The system of claim 6 wherein said card-type external terminal further comprises a second battery means for supplying power to the elements of said card-type external terminal.

8. The system of claim 2 wherein said card-type external terminal further comprises second display driving means, connected to said second processing means, for driving said second means for displaying data.

9. The system of claim 8 wherein said card-type external terminal further comprises a second battery means for supplying power to the elements of said card-type external terminal.

10. The system of claim 9 wherein said portable electronic apparatus further comprises a first battery means for supplying power to the elements of said portable electronic apparatus.

11. The system of claim 8 wherein said portable electronic apparatus further comprises:
    display driving means, connected to said processing means, for driving said first means for displaying data;
    memory means, connected to said processing means for storing data entered into said portable electronic apparatus; and
    interfacing means for electrically connecting said processing means to a peripheral device.

12. The system of claim 11 wherein said portable electronic apparatus further comprises a first battery means for supplying power to the elements of said portable electronic apparatus.

13. The system of claim 12 wherein said card-type external terminal further comprises a second battery means for supplying a power to the elements of said card-type external terminal.

* * * * *